(12) United States Patent
Collins et al.

(10) Patent No.: US 9,789,811 B2
(45) Date of Patent: Oct. 17, 2017

(54) DAYLIGHT OPENING SURROUND

(71) Applicant: Jaguar Land Rover Limited, Coventry (GB)

(72) Inventors: Mark Collins, Coventry (GB); Hugo Nightingale, Coventry (GB); Arafat Bhatti, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 71 days.

(21) Appl. No.: 14/774,284

(22) PCT Filed: Mar. 12, 2014

(86) PCT No.: PCT/EP2014/054888
§ 371 (c)(1),
(2) Date: Sep. 10, 2015

(87) PCT Pub. No.: WO2014/140130
PCT Pub. Date: Sep. 18, 2014

(65) Prior Publication Data
US 2016/0016506 A1 Jan. 21, 2016

(30) Foreign Application Priority Data

Mar. 12, 2013 (GB) .................................. 1304397.1

(51) Int. Cl.
*B60Q 1/26* (2006.01)
*B60Q 1/32* (2006.01)
(Continued)

(52) U.S. Cl.
CPC ................. *B60Q 1/268* (2013.01); *B60J 1/20* (2013.01); *B60J 9/00* (2013.01); *B60J 10/15* (2016.02);
(Continued)

(58) Field of Classification Search
CPC .... B60Q 1/268; B60Q 1/0023; B60Q 1/0035; B60Q 1/0094; B60Q 1/2619;
(Continued)

(56) References Cited

U.S. PATENT DOCUMENTS 5,163,731 A    11/1992  Gold
5,193,895 A *   3/1993  Naruke .................. B60Q 1/323
                                                  362/249.01
(Continued)

FOREIGN PATENT DOCUMENTS

DE    10 2006 049 872 A1    10/2007
DE    10 2008 027 128 A1     3/2009
(Continued)

OTHER PUBLICATIONS

Combined Search and Examination Report, GB 1304397.1, dated Aug. 12, 2013, 7 pages.
(Continued)

*Primary Examiner* — Bao Q Truong
(74) *Attorney, Agent, or Firm* — Myers Bigel, P.A.

(57) ABSTRACT

The present invention relates to a daylight opening surround (3; 101) for a motor vehicle (1). The surround (3; 101) has a light transmitting element (15; 103) for transmitting light from a light source (19; 111). The present invention also relates to a light transmitting element (15; 103) for a surround (3; 101); a controller for a daylight opening surround (3; 101); and a motor vehicle (1).

15 Claims, 6 Drawing Sheets

(51) Int. Cl.
  B60Q 1/50    (2006.01)
  B60Q 1/52    (2006.01)
  B60R 13/04   (2006.01)
  F21S 8/10    (2006.01)
  B60Q 1/00    (2006.01)
  B60Q 1/48    (2006.01)
  B60J 1/20    (2006.01)
  B60J 9/00    (2006.01)
  B60J 10/24   (2016.01)
  B60J 10/273  (2016.01)
  B60J 10/84   (2016.01)
  B60J 10/15   (2016.01)
  B60J 10/20   (2016.01)
  B60J 10/23   (2016.01)
  B60J 10/265  (2016.01)
  B60J 10/70   (2016.01)
  B60J 10/80   (2016.01)

(52) U.S. Cl.
  CPC .......... *B60J 10/20* (2016.02); *B60J 10/23* (2016.02); *B60J 10/24* (2016.02); *B60J 10/265* (2016.02); *B60J 10/273* (2016.02); *B60J 10/70* (2016.02); *B60J 10/80* (2016.02); *B60J 10/84* (2016.02); *B60Q 1/0023* (2013.01); *B60Q 1/0035* (2013.01); *B60Q 1/0094* (2013.01); *B60Q 1/2619* (2013.01); *B60Q 1/2661* (2013.01); *B60Q 1/323* (2013.01); *B60Q 1/488* (2013.01); *B60Q 1/50* (2013.01); *B60Q 1/525* (2013.01); *B60R 13/04* (2013.01); *F21S 48/215* (2013.01); *F21S 48/2237* (2013.01); *F21S 48/2268* (2013.01); *B60Q 2400/40* (2013.01)

(58) Field of Classification Search
  CPC ...... B60Q 1/2661; B60Q 1/323; B60Q 1/488; B60Q 1/50; B60Q 1/525; B60Q 2400/40; B60R 13/04; F21S 48/215; F21S 48/2237; F21S 48/2268; B60J 10/15; B60J 10/20; B60J 10/23; B60J 10/24; B60J 10/265; B60J 10/273; B60J 10/70; B60J 10/80; B60J 10/84; B60J 1/20; B60J 9/00

See application file for complete search history.

(56) References Cited

U.S. PATENT DOCUMENTS

| | | | |
|---|---|---|---|
| 5,400,225 A | 3/1995 | Currie | |
| 6,278,827 B1* | 8/2001 | Sugiyama | G02B 6/001 385/123 |
| 6,425,679 B1* | 7/2002 | Yu | B60Q 1/32 362/145 |
| 6,505,963 B1* | 1/2003 | Chiang | B60Q 1/2696 362/245 |
| 2002/0126498 A1* | 9/2002 | Atkinson | B60J 10/00 362/501 |
| 2002/0152686 A1 | 10/2002 | Whitehead | |
| 2005/0073852 A1 | 4/2005 | Ward | |
| 2008/0093979 A1* | 4/2008 | Bechtel | C09K 11/7731 313/503 |
| 2010/0214798 A1* | 8/2010 | Salter | B60R 13/02 362/520 |
| 2012/0257407 A1* | 10/2012 | Demma | B60R 13/04 362/602 |

FOREIGN PATENT DOCUMENTS

| | | |
|---|---|---|
| DE | 10 2008 012 242 A1 | 9/2009 |
| DE | 10 2010 019 764 A1 | 11/2011 |
| DE | 10 2011 106 318 A1 | 1/2013 |
| DE | 10 2012 017 281 A1 | 3/2013 |
| EP | 2 363 324 A1 | 5/2013 |
| EP | 2 363 324 B1 | 5/2013 |
| GB | 1 307 910 | 2/1973 |

OTHER PUBLICATIONS

Combined Search and Examination Report, GB 1404376.4, dated Sep. 22, 2014, 8 pages.

International Search Report, PCT/EP2014/054888, dated Oct. 2, 2014, 6 pages.

* cited by examiner

DAYLIGHT OPENING SURROUND

RELATED APPLICATIONS

This application is a 35 U.S.C. §371 national stage application of PCT Application No. PCT/EP2014/054888, filed on Mar. 12, 2014, which claims priority from Great Britain Patent Application No. 1304397.1, filed on Mar. 12, 2013, the contents of which are incorporated herein by reference in their entireties. The above-referenced PCT International Application was published in the English language as International Publication No. WO 2014/140130 A2 on Sep. 18, 2014.

TECHNICAL FIELD

The present invention relates to a daylight opening surround for a motor vehicle; a light transmitting element for a surround; a controller for a daylight opening surround; and a motor vehicle. Aspects of the invention relate to a surround, to an element, to a controller and to a vehicle.

BACKGROUND

One or more windows of a motor vehicle can be referred to as a daylight opening. For example, a side daylight opening can refer collectively to the side windows of the vehicle; whereas a front daylight opening can refer to the front windscreen of the vehicle. The daylight opening surround is the frame around the respective daylight opening. In the case of a fixed window, such as a rear quarter window, the surround can comprise a seal for sealingly mounting the window to the vehicle. The surround can also form a frame for cooperating with a window, particularly in the case of a side window which can be lowered. The surround forms part of the vehicle brightwork and can have a chrome or matte finish.

At least certain embodiments of the present invention relate to an improved daylight opening surround.

SUMMARY OF THE INVENTION

Aspects of the present invention relate to a daylight opening surround for a motor vehicle; a light transmitting element for a surround; a controller for a daylight opening surround; and a motor vehicle, as claimed in the appended claims.

According to a further aspect of the present invention there is provided a daylight opening surround for a motor vehicle, the surround comprising a light transmitting element for transmitting light from a light source. The light transmitting element is operatively arranged to transmit light from the light source to an exterior of the surround. The surround according to the present invention can be illuminated by one or more light sources. The daylight opening surround can thereby be used to provide a visual indication of vehicle status. The daylight opening surround could, for example, be illuminated to indicate when the vehicle has been unlocked; or to indicate that the vehicle has been primed ready to be unlocked. At least in certain embodiments, the illumination of the daylight opening surround can be controlled to convey different information to a user. For example, the colour and/or intensity and/or pattern of illumination can be varied.

The light transmitting element(s) can extend partially or completely around said surround. The light transmitting element could comprise one or more members. The light transmitting element could extend along a roofline of the vehicle, for example along a cant rail or along a top of a side window; or along a shoulder line of the vehicle, for example along a base of a side window. Alternatively, the light transmitting element can extend substantially completely around the daylight opening. This arrangement can accentuate the shape of the daylight opening.

The light transmitting element transmits visible light. The light transmitting element can form an optical waveguide. Light can be reflected internally within the light transmitting element and transmitted along some or all of its length. The light transmitting element can comprise a transmissive outer surface. The outer surface can thereby allow light reflected internally to be transmitted to the exterior of the surround. The exterior of the surround is thereby illuminated. By forming an optical waveguide, one or more discrete light sources can be used to emit light into the light transmitting element.

A cladding having a lower refractive index than the light transmitting element can be disposed on an inner surface and/or at least one lateral surface of said light transmitting element. Alternatively, or in addition, a reflective layer can be disposed on an inner surface and/or at least one lateral surface of said light transmitting element. The cladding and/or reflective layer(s) can cause light to be confined to the light transmitting element by total internal reflection. The reflective layer could, for example, be a reflective coating or a metallic foil.

A light transmitting layer can be disposed on the outer surface of the light transmitting element. The light transmitting layer can optionally be reflective and/or coloured. The light transmitting layer could, for example, comprise a reflective-transmissive layer. The layer could be formed integrally with the light transmitting element (for example co-moulded or co-extruded); or applied in a subsequent process step.

The light transmitting element can have a substantially uniform section along part or all its length. This arrangement is advantageous since it allows a uniform intensity of light to be emitted.

The light transmitting element can be integrated with a resilient seal. The seal can be configured for engaging a vehicle window. The resilient seal can be made of rubber or a similar material.

The daylight opening surround can comprise at least one interface or connector for optically coupling said light transmitting element to at least one light source. In use, it is envisaged that said at least one light source can be disposed in one or more vehicle pillars (for example, the A-pillar, B-pillar and C-pillar, depending on the vehicle configuration and number of doors). The at least one interface or connector can be provided on said daylight opening surround for connecting to said at least one light source.

The light transmitting element can be formed from a transparent, semi-transparent or translucent material. A translucent material can diffuse light providing a more uniform illumination which can help to obfuscate the position of the light sources. A diffuser could be disposed on the light transmitting element. The diffuser could be configured, in use, to homogenise the light transmitted there through from the light source.

The daylight opening surround can be configured, in use, to extend partially or completely around a side window and/or a rear window of the motor vehicle. Alternatively, the daylight opening surround could be configured to extend around a rear window or a front windscreen of the vehicle.

According to a further aspect of the present invention there is provided a daylight opening surround as described herein in combination with at least one light source for illuminating the daylight opening surround. The light source can comprise a strip of LEDs, for example disposed behind the light transmitting element. Alternatively, the light source can comprise one or more point light sources for projecting light into the light transmitting element to be reflected internally along some or all of the light transmitting element.

The daylight opening surround may comprise a phosphorescent material, in which case the at least one light source may be a source of blue or ultraviolet light. Optionally, the at least one light source may be configured, in use, to emit light having a wavelength between 350 nm and 465 nm inclusive. The light source may comprise one or more selected from the group comprising a light-emitting-diode (LED), a laser and a laser diode.

According to a still further aspect of the present invention, there is provided a light transmitting element for a daylight opening surround of the type described herein.

According to a yet further aspect of the present invention, there is provided a controller for controlling operation of at least one light source associated with a daylight opening surround as claimed in any one of the preceding claims. The controller can be configured to energize the at least one light source in dependence on a change in the vehicle status, for example the vehicle being unlocked. The controller can be configured to de-energize said at least one light source in dependence on a door of the motor vehicle being opened.

The controller can be configured to energize said at least one light source in dependence on detection of an object proximal the vehicle. The object may be another road user, for example a pedestrian or a cyclist. Alternatively, the object may be another vehicle, e.g. a motor vehicle, an automobile or a motor cycle.

Optionally, the controller can be configured to energize said at least one light source to provide an indication of the state of an energy store on the vehicle. By way of example, the, controller can be configured to energize said at least one light source to provide an indication of the state of charge of a traction battery in an electric vehicle.

Alternatively, the controller can be configured to energize the at least one light source to provide an indication of autonomous operation of the vehicle.

According to a yet still further aspect of the present invention there is provided a vehicle comprising a daylight opening surround as described herein; and/or a controller as described herein.

According to a further aspect of the present invention there is provided a vehicle comprising a light transmitting element operatively illuminated to provide an approach signature for the vehicle, wherein a light transmitting layer is disposed on an outer surface of the light transmitting element, the light transmitting layer having a reflective and/or coloured finish. The approach signature can comprise an optical signal which is visible from an exterior of the vehicle. The approach signature can, for example, provide an optical indication that a user is approaching the vehicle and/or that a wireless key fob associated with the vehicle has been detected. The provision of a coloured and/or reflective light transmitting layer can serve to hide or disguise the function of the light transmitting element until it has been illuminated.

The light transmitting layer can provide a chrome finish. Accordingly, the light transmitting element can take the form of a brightwork component or an external decorative component. The light transmitting element can, for example, be in the form of a daylight opening surround or a grille surround. At least one light source can be optically coupled to the light transmitting element. A controller can be provided for controlling operation of said at least one light source. The controller can be configured to energize said at least one light source in dependence on the motor vehicle being unlocked. Furthermore, the controller can be configured to de-energize said at least one light source in dependence on a door of the motor vehicle being opened or the vehicle being locked. Thus, the approach signature can comprise illuminating the light transmitting element for the period between unlocking the vehicle and the vehicle door being opened.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the present invention will now be described, by way of example only, with reference to the accompanying figures, in which.

DETAILED DESCRIPTION OF AN EMBODIMENT

A vehicle 1 comprising an illuminated daylight opening (DLO) surround 3 in accordance with a first embodiment of the present invention will now be described with reference to FIGS. 1 to 4. The surround 3 can be selectively illuminated to indicate the vehicle status, for example to indicate that the vehicle 1 has been unlocked remotely (with a key fob or a passive entry system).

Figure 1:
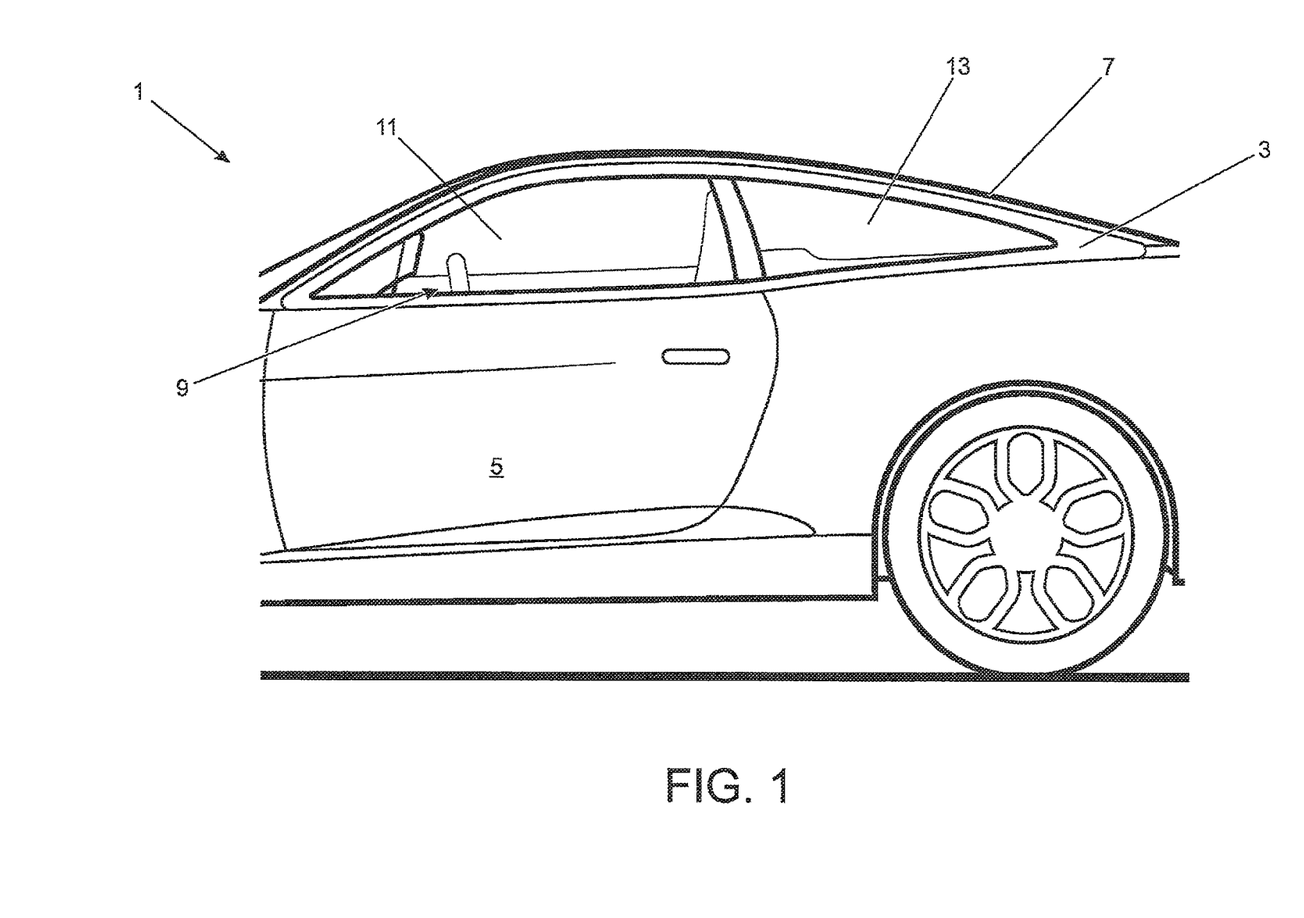
FIG. 1 shows a side elevation of a motor vehicle comprising an illuminated daylight opening surround according to a first embodiment of the present invention.

The vehicle 1 in the present embodiment is a three-door vehicle 1 having two side doors 5 and a tailgate 7. The surround 3 extends circumferentially around a side daylight opening 9 of the vehicle 1. The side daylight opening 9 in the present embodiment comprises a side window 11 provided in the door 5; and a fixed rear quarter window 13. The surround 3 is integrated with a rubber moulding to cooperate with the side and rear quarter windows 11, 13 to form a seal 14.

Figure 6:
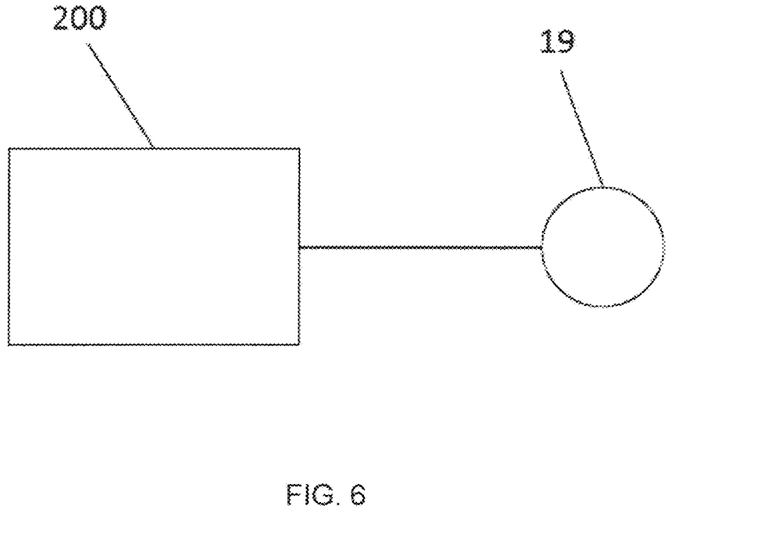
FIG. 6 shows a controller configured to energize the light source illustrated in FIG. 2, according to some embodiments of the present invention.

The surround 3 comprises an elongate light transmitting element 15 which extends around the side daylight opening 9, following the profile of the door 5, the side window 11, the rear quarter window 13 and the roof of the vehicle 1. The light transmitting element 15 could be formed as a single component, but in the present embodiment it comprises a series of members (one of which is illustrated in situ in FIG. 2) arranged end-to-end to form a continuous strip, in the present embodiment the side window 11 is frameless and the surround 3 is mounted to a cant rail 17 which extends above the door 5 and defines a lateral edge of the roof. A light source 19 in the form of a strip of light emitting diodes (LEDs) is disposed in a channel 20 formed in an underside of the light transmitting element 15. A controller 200 (FIG. 6) is provided for energizing the light source 19 to illuminate the surround 3.

Figure 2:
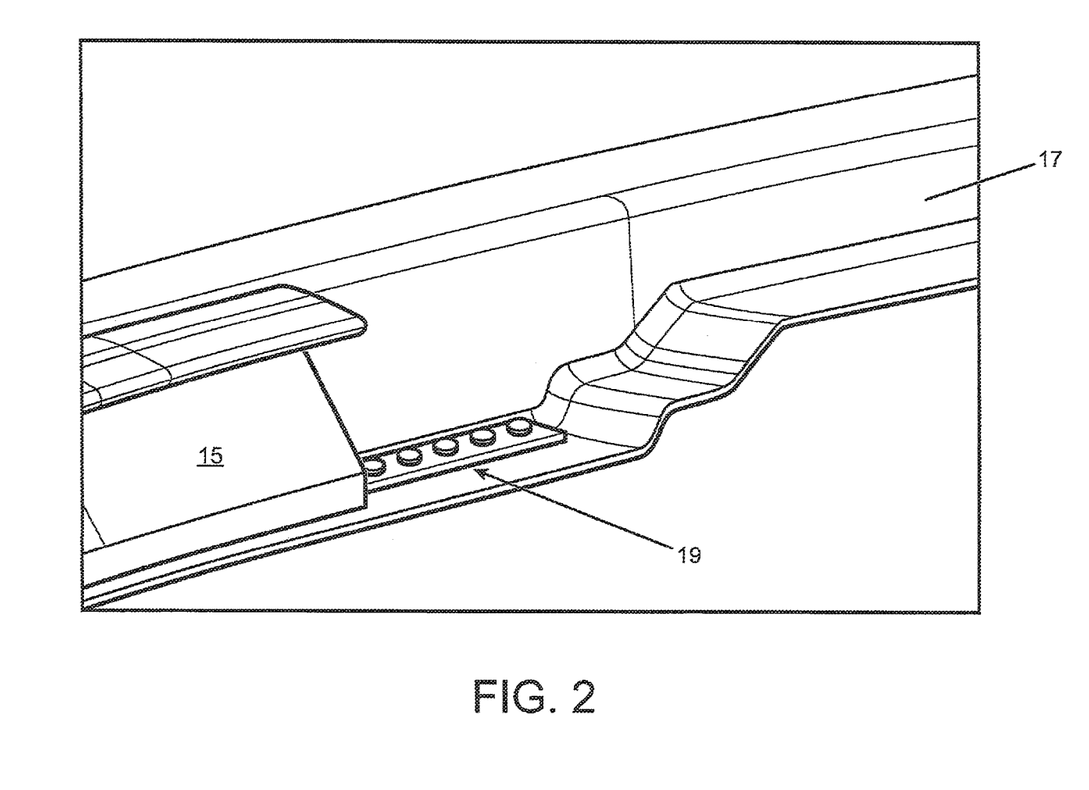
FIG. 2 shows a light transmitting element of the daylight opening surround mounted to a vehicle cant rail.
Figure 3:
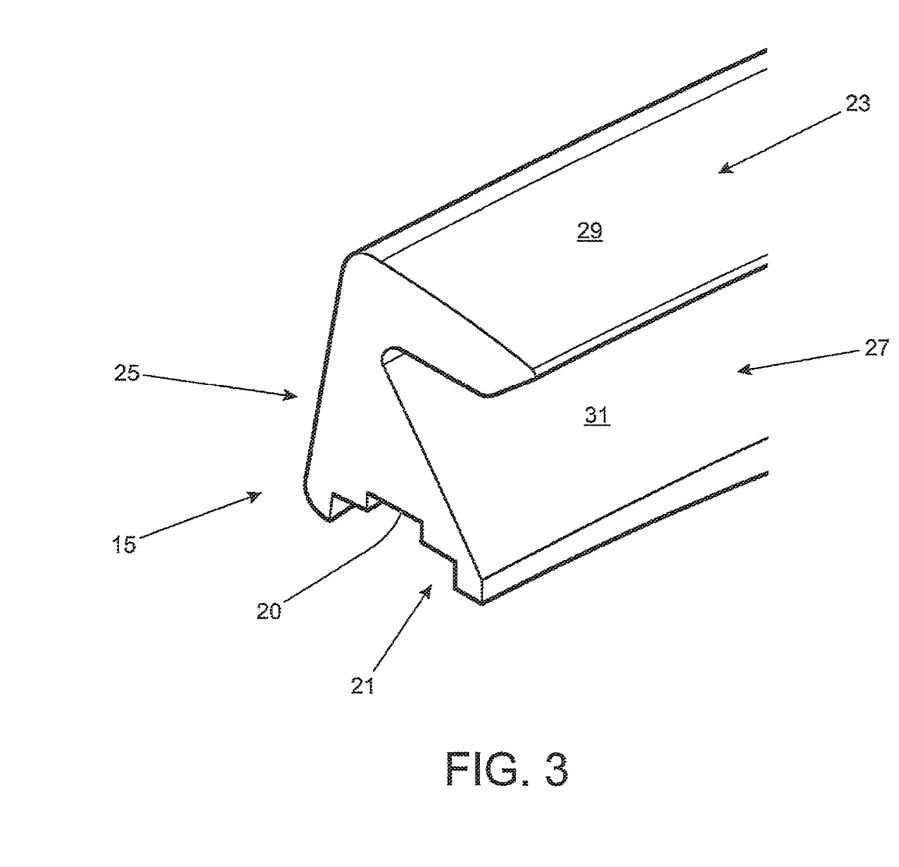
FIG. 3 shows a perspective view of the light transmitting element shown in FIG. 2.

The light transmitting element 15 is formed from a transparent or translucent plastics material, for example by moulding or extrusion. The light transmitting element 15 has an inner surface 21, an outer surface 23, a first lateral surface 25 and a second lateral surface 27. The inner surface 21 is optically transmissive to allow light to enter the light transmitting element 15 from the light source 19; and the outer surface 23 is optically transmissive to allow light from the light source 19 to exit the light transmitting element 15. The first and second lateral surfaces 25, 27 are optically reflective to inhibit the transmission of light at the sides of the light transmitting element 15. In the present embodiment, a reflective layer 31 is applied to the lateral surfaces 25, 27 to reflect light internally within the light transmitting element 15. The light transmitting element 15 can thereby function as an optical waveguide for transmitting light from the light source 19 to the outer surface 23. Instead of providing a reflective coating, an optical cladding having a lower refractive index than the light transmitting element 15 can be disposed on the lateral surfaces 25, 27 (and optionally also the inner surface 21) to cause internal reflection within the light transmitting element 15.

A reflective-transmissive layer 29 (i.e., a light transmitting layer), for example in the form of a plastic strip or coating, is applied to the outer surface 23 to disguise the function of the light transmitting element 15. The reflective-transmissive layer 29 has an outer surface (disposed to the exterior of the vehicle 1) which reflects incident light; and an inner surface (disposed proximal the outer surface 23 of the light transmitting element) which permits the transmission of incident light. Thus, the reflective-transmissive layer 29 has a mirrored (or chromed) exterior finish, but can be illuminated by the light source 19 to create a backlit effect. The reflective-transmissive layer 29 has a mirrored exterior finish and can replicate traditional chrome brightwork when the light source 19 is not energized. When the light source 19 is energized, the transmission of light through the light transmitting element 15 and the reflective-transmissive layer 29 illuminates the surround 3. A suitable reflective transmissive layer can be formed by combining a sheet of the Super Techmirror® product manufactured by Wavelock Advanced Technologies of Japan (www.wavelock-at.co.jp) with a suitable transmissive backing material. The layer 29 can, for example, be co-moulded or co-extruded with the light transmitting element 15; or bonded to its outer surface 23 after the light transmitting element 15 has been formed.

The surround 3 is fixedly mounted to the vehicle 1. The side window 11 cooperates with the integrated rubber moulding when the window 11 is in its closed (raised) position. The rear window 13 is mounted to the surround 3 such that the integrated rubber moulding forms a seal. The light source 19 is disposed in the channel 20 formed in the light transmitting element 15 and is electrically connected to the controller (not shown). The controller is connected to an on-board control unit configured to control access to the vehicle 1. Specifically, the control unit communicates wirelessly with a key fob to lock/unlock the doors 5 and/or the tailgate 7.

Figure 4:
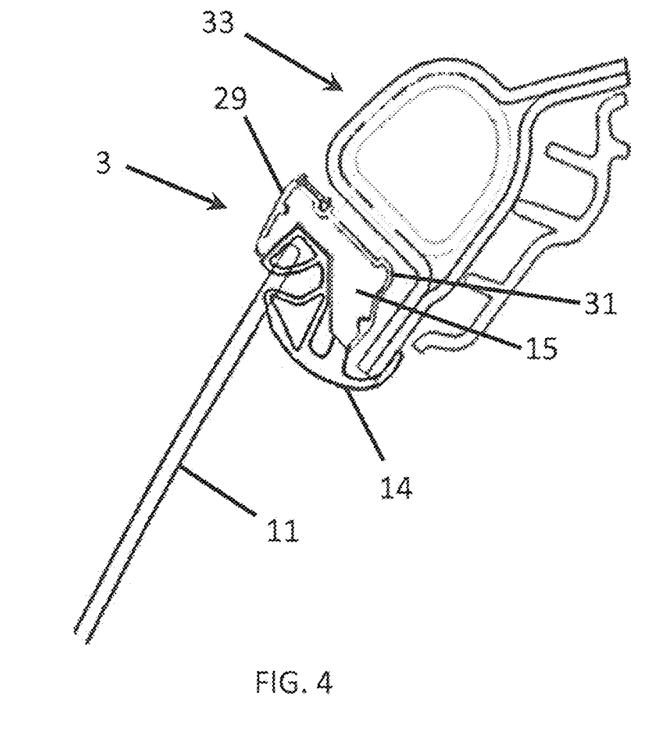
FIG. 4 shows a sectional view of the light transmitting element in relation to the A-pillar of the vehicle.

A sectional view of the surround 3 and the integrated seal 14 is shown in FIG. 4. The surround 3 is mounted to an A-pillar 33 of the vehicle 1 and the seal 14 is arranged to cooperate with the side window 11 to inhibit the ingress of water. In use, the seal 14 serves to protect the reflective layer 31 applied to the lateral surfaces 25, 27 of the surround 3.

In use, the control unit transmits an energize control signal to the surround controller to illuminate the surround 3 when a signal is received from the key fob to unlock the doors 5 and/or the tailgate 7. The controller energizes the light source 19 to emit light which is transmitted through the light transmitting element 15 and the reflective-transmissive layer 29. The surround 3 is thereby illuminated and provides a visual indication that the vehicle 1 has been unlocked. This illumination provides an approach signature for the vehicle 1. Upon detection of one of the doors 5 being opened, the control unit transmits a de-energize control signal to the surround controller and the light source 19 is de-energized. Equally, the LEDs could be illuminated in one or more predefined sequences which could convey status information. For example, the controller could be configured to control the light source 19 to generate a pulse of light which travels around the light transmitting element 15 in a clockwise or anticlockwise direction.

In addition to the abovementioned use, the surround 3 and controller are optionally arranged to provide a proximity warning to other road users if said other road users are deemed to be too close to the vehicle 1. For example, relative distances between the vehicle 1 and surrounding objects such as pedestrians, cyclists, and vehicles are measured using, for example, parking distance control sensors (PDCs) on the vehicle and the surround is illuminated in dependence on the determined relative distance to warn others of their proximity to the vehicle 1. In this case the surround 3 is illuminated with a constant or flashing light to affect said warning. This is envisaged as being particularly useful for warning of close proximity to cyclists.

Alternative uses for the surround 3 include, without limitation:

provision of an indication of traction battery state-of-charge (SOC) for electric vehicles (EV). In this case the state of charge is indicated by varying the colour or hue of the light emitted by the surround 3. Alternatively, or in addition, the spatial properties of the illumination of the surround 3 may be varied, for example by illuminating a sub-section of the surround 3 wherein the length of the subsection is controlled in dependence on the state of charge. A further alternative is to vary the temporal properties of the illumination of the surround 3, for example by modulating the intensity of the illumination in a time-varying manner wherein the frequency of the modulation is controlled in dependence on the state of charge;

providing an indication to other road users of autonomous operation of a vehicle. This is envisaged as being particularly useful where the vehicle is capable of controlling at least one driving function, e.g. speed, direction, acceleration, or braking, independently of a control input from the driver. In this case, the colour, hue or temporal properties of the illumination of the surround 3 are controlled in dependence on whether the vehicle is being controlled by the driver or is operating autonomously.

The surround 3 described herein can be modified to utilise the light transmitting element 15 as an optical waveguide to transmit light from one or more point sources. The primary change is to modify the light source 19 to provide said one or more point light sources at one or more discrete locations along the length of the light transmitting element 15. It is envisaged, for example, a light source could be disposed in a pillar for supporting the vehicle roof (i.e. one or more of the A-pillar, B-pillar and C-pillar, depending on the vehicle configuration). The light transmitting element 15 can comprise an interface or connector for optically coupling with each point light source. A reflective coating or an optical cladding can be disposed on the inner surface 21 and the lateral surfaces 25, 27 of the light transmitting element 15 to cause internal reflection. In use, light emitted from the point light source(s) is transmitted along the length of the light transmitting element 15. The transmitted light can travel through the outer surface 23 of the light transmitting element 15 to illuminate the surround 3 in accordance with the present invention. The operation of the controller is unchanged from the earlier embodiment.

The surround 3 has been described herein with reference to a three-door vehicle. It will be appreciated that the present invention is equally applicable to other vehicle configurations, such as sedans, station wagons and hatchbacks. Indeed, the present invention is not limited to use with side daylight openings 11. For example, a light transmitting element 15 could be incorporated into a daylight opening at the rear of the vehicle, for example the tailgate. In this arrangement, the light transmitting element 15 could provide other functions, such as a brake light to indicate when the vehicle is braking. The light transmitting element 15 could also be illuminated to indicate when the tailgate is primed for automatic opening and/or closing. Furthermore, the apparatus described herein could be modified to form a headlight surround or the like.

The light source 19 could be configured to display different colours to represent different functions/status information. For example, the light source 19 could comprise multi-colour LEDs.

Figure 5:
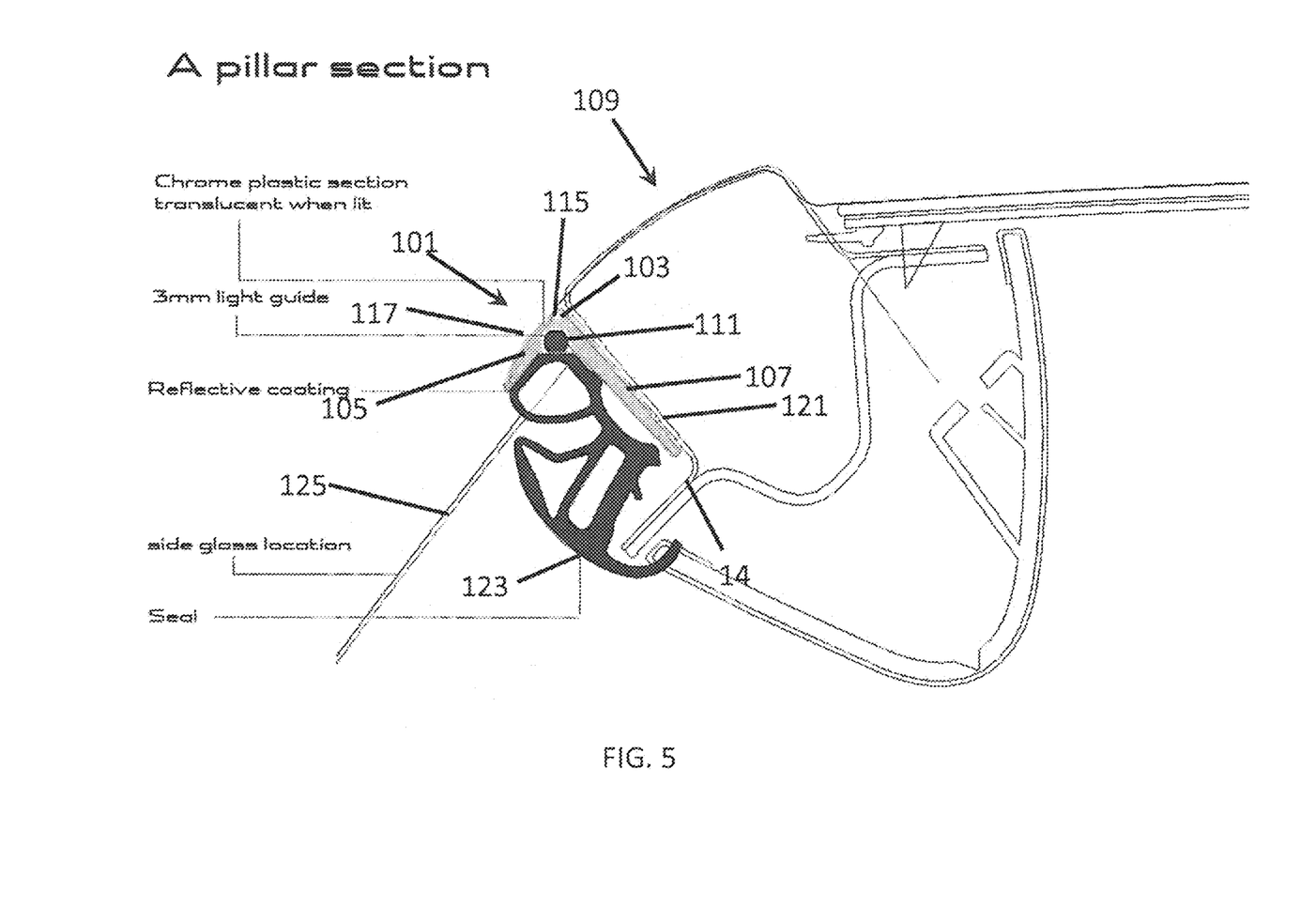
FIG. 5 shows a sectional view of a second embodiment of the light transmitting element according to the present invention.

A cross-sectional view of a DLO surround 101 according to a second embodiment of the present invention is illustrated in FIG. 5. The surround 101 comprises an elongate light transmitting element 103 formed from a transparent or translucent plastic material and has a generally L-shaped configuration. The surround 101 comprises an outer section 105 which is visible from an exterior of the vehicle (not shown) to which the surround 101 is fitted. The surround 101 also comprises an inner section 107 adapted for mounting the surround 101 to an A-pillar 109 of the vehicle. A light guide 111 is disposed at the junction between the outer section 105 and the inner section 107 of the surround 101. The light guide 111 is a tubular member having a diameter of approximately 3 mm and extending along the length of the surround 101. The light guide 111 can be formed from a transparent plastics material and optically coupled to one or more light sources (not shown).

The outer section 105 of the surround 101 has an exterior surface 115 which is visible during normal operation. A reflective-transmissive coating 117 is applied to the exterior surface 115. The reflective-transmissive coating 117 has the same composition as the coating described herein in respect of the surround 3 according to the first embodiment of the present invention. A reflective coating 119 is applied over an interior surface 121 of the surround 101 to reflect light emitted from the light guide 111 internally within the surround 101. The reflective coating 13 could be applied to a substrate (not shown) disposed behind the light guide 111. Alternatively, a reflective backing member, for example formed from a reflective material, could be provided behind the surround. A rubber moulding 123 is attached to the surround 101 to form a seal with a side window 125 of the vehicle. The rubber moulding 123 could be bonded to the surround 101 or retained in position by one or more fasteners.

The invention has been described with reference to a light transmitting element 15; 103 having a reflective-transmissive layer 29; 117 disposed on its outer surface 23; 115. The reflective-transmissive layer 29; 117 could be omitted or a layer having different properties could be applied. For example, the layer 29 could function as a diffuser to diffuse light emitted from the light source 19; 111. Alternatively, a coloured transmissive layer could be applied to the light transmitting element 15; 103. A transmissive layer coloured black could be used, for example to match integrated door seals. An opaque or semi-opaque pattern or design could be formed on the layer 29; 117, the pattern or design only being visible when the surround 3; 101 is illuminated.

In the foregoing embodiments the light source 19 illuminates the light transmitting element 15; 103 directly with electromagnetic radiation having a wavelength within the visible spectrum. However, the illumination is optionally provided indirectly using wavelength conversion means, for example utilising phosphorescence. In the first embodiment described above, a phosphor material is applied to the underside of the light transmitting element 15 and/or is disposed within the body of the light transmitting element 15. In the second embodiment, a phosphor material is applied to a surface of the light transmitting element 103 or the light guide 111, or is disposed within the body of the light transmitting element 103 or the light guide 111. In both embodiments, the phosphor material is energised with a specific tailored wavelength of light e.g. UV (350-400 nm) or blue (400-465 nm). In this arrangement the light source 19 is either an LED or a laser diode. One of the benefits of using the phosphor is that it can be hidden until lit, creating light from invisible light (UV). The phosphor can also be tailored to produce light in a number of different colours.

It will be appreciated that various changes and modifications can be made to the present invention without departing from the present invention. Further aspects of the present invention will be described with reference to the following numbered paragraphs.

1. A daylight opening surround for a motor vehicle, the surround comprising a light transmitting element for transmitting light from a light source.

2. A daylight opening surround as described in paragraph 1, wherein said light transmitting element is elongated and extends partially or completely around said surround.

3. A daylight opening surround as described in paragraph 1, wherein said light transmitting element forms an optical waveguide.

4. A daylight opening surround as described in paragraph 1, wherein a light transmitting layer is disposed on an outer surface of said light transmitting element.

5. A daylight opening surround as described in paragraph 4 wherein the light transmitting layer is reflective and/or coloured.

6. A daylight opening surround as described in paragraph 1, the light transmitting element comprising an inner surface and at least one lateral surface; wherein a cladding having a lower refractive index than the light transmitting element or a reflective layer is disposed on said inner surface and/or said at least one lateral surface.

7. A daylight opening surround as described in paragraph 1, wherein the light transmitting element is integrated with a resilient seal.

8. A daylight opening surround as described in paragraph 1 comprising at least one interface or connector for optically coupling said light transmitting element to at least one light source.

9. A daylight opening surround as described in paragraph 1, wherein said light transmitting element comprises a transparent, semi-transparent or translucent material.

10. A daylight opening surround as described in paragraph 1, wherein said light transmitting element comprises a diffuser configured, in use, to homogenise the light transmitted there through from the light source.

11. A daylight opening surround as described in paragraph 1, wherein the daylight opening surround is configured, in use, to extend partially or completely around a side window and/or a rear window of the motor vehicle.

12. A daylight opening surround as described in paragraph 1 in combination with at least one light source for illuminating the daylight opening surround.

13. A daylight opening surround as described in paragraph 12 comprising a phosphorescent material and wherein the at least one light source is a source of blue or ultraviolet light.

14. A daylight opening surround as described in paragraph 13 wherein the at least one light source is configured, in use, to emit light having a wavelength between 350 nm and 465 nm inclusive.

15. A light transmitting element for a daylight opening surround as described in paragraph 1.

16. A controller for controlling operation of at least one light source associated with a daylight opening surround as described in paragraph 1.

17. A controller as described in paragraph 16 configured to energize said at least one light source in dependence on the motor vehicle being unlocked; and optionally to de-energize said at least one light source in dependence on a door of the motor vehicle being opened.

18. A controller as described in paragraph 16 configured to energize said at least one light source in dependence on detection of an object proximal the vehicle.

19. A controller as described in paragraph 16 configured to energize said at least one light source to provide an indication of the state of an energy store on the vehicle.

20. A controller as described in paragraph 16 configured to energize said at least one light source to provide an indication of autonomous operation of the vehicle.

21. A vehicle comprising a daylight opening surround as described in paragraph 1; and/or a controller as described in paragraph 16.

22. A vehicle comprising a light transmitting element operatively illuminated to provide an approach signature for the vehicle, wherein a light transmitting layer is disposed on an outer surface of the light transmitting element, the light transmitting layer having a reflective and/or coloured finish.

23. A vehicle as described in paragraph 22 further comprising at least one light source optically coupled to said light transmitting element; and a controller for controlling illumination of said at least one light source.

24. A vehicle as described in paragraph 23, wherein the controller is configured to energize said at least one light source in dependence on the motor vehicle being unlocked; and optionally to de-energize said at least one light source in dependence on a door of the motor vehicle being opened.

The invention claimed is:

1. A daylight opening surround for a motor vehicle, the surround comprising a plurality of point light sources and a light transmitting element, the light transmitting element comprising:

an inner surface located on an underside of the light transmitting element;
at least one outer surface;
at least two lateral surfaces between the inner surface and the outer surface;
a channel formed in said inner surface;
a cladding having a lower refractive index than said light transmitting element or a reflective layer disposed on said at least two lateral surfaces; and
a light transmitting layer disposed on an outer surface of said light transmitting element, wherein the plurality of point light sources are located in the channel and the light transmitting element comprises an optical waveguide for transmitting light from the plurality of point light sources to the at least one outer surface.

2. The daylight opening surround of claim 1, wherein said light transmitting element is elongated and extends at least partially around said surround.

3. The daylight opening surround of claim 1, wherein the light transmitting layer is reflective and/or coloured.

4. The daylight opening surround of claim 1, wherein the light transmitting element is integrated with a resilient seal.

5. The daylight opening surround of claim 1, comprising at least one interface or connector that optically couples said light transmitting element to the light source.

6. The daylight opening surround of claim 1, wherein said light transmitting element comprises a transparent, semi-transparent or translucent material.

7. The daylight opening surround of claim 1, wherein said light transmitting element comprises a diffuser configured to homogenise the light transmitted therethrough from the light source.

8. The daylight opening surround of claim 1, wherein the daylight opening surround is configured to extend at least partially around a side window and/or a rear window of the motor vehicle.

9. The daylight opening surround of claim 1 in combination with at least one light source for illuminating the daylight opening surround.

10. The daylight opening surround of claim 1, comprising a controller configured to control operation of the plurality of point light sources.

11. The daylight opening surround of claim 10, wherein the controller is configured to energize said light source in dependence on the motor vehicle being unlocked, and wherein the controller is configured to de-energize said light source in dependence on a door of the motor vehicle being opened.

12. The daylight opening surround of claim 10, wherein the controller is configured to energize said light source in dependence on detection of an object proximal the motor vehicle.

13. The daylight opening surround of claim 10, wherein the controller is configured to energize said light source to provide an indication of a state of an energy store on the motor vehicle.

14. The daylight opening surround of claim 10, wherein the controller is configured to energize said light source to provide an indication of autonomous operation of the motor vehicle.

15. A vehicle comprising the daylight opening surround of claim 1.

* * * * *